United States Patent
Ryan

(10) Patent No.: US 7,571,613 B1
(45) Date of Patent: *Aug. 11, 2009

(54) SYSTEM AND METHOD FOR WATER PASTEURIZATION AND POWER GENERATION

(75) Inventor: Gregory B. Ryan, Geyserville, CA (US)

(73) Assignee: Pasteurization Technology Group, LLC, Geyserville, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/189,627

(22) Filed: Jul. 25, 2005

Related U.S. Application Data

(63) Continuation of application No. 10/713,358, filed on Nov. 14, 2003, now Pat. No. 6,931,860.

(60) Provisional application No. 60/427,069, filed on Nov. 18, 2002.

(51) Int. Cl.
*F02C 6/04* (2006.01)

(52) U.S. Cl. ............................................. 60/783; 60/784
(58) Field of Classification Search ................... 60/783, 60/784, 39.182
See application file for complete search history.

(56) References Cited

U.S. PATENT DOCUMENTS

| | | | |
|---|---|---|---|
| 3,213,001 A | 10/1965 | Schmidt | |
| 4,094,747 A | 6/1978 | Pfenninger | |
| 4,571,949 A * | 2/1986 | Moke | 60/655 |
| 4,827,711 A * | 5/1989 | Isaksson | 60/775 |
| 5,212,942 A * | 5/1993 | Malohn | 60/784 |
| 5,366,514 A | 11/1994 | Becnel, Jr. et al. | |
| 6,931,860 B2 * | 8/2005 | Ryan | 60/783 |
| 7,228,682 B2 * | 6/2007 | Kashler | 60/39.182 |
| 2002/0050134 A1 * | 5/2002 | Bronicki et al. | 60/39.182 |
| 2002/0116930 A1 * | 8/2002 | Anderson | 60/772 |
| 2004/0045682 A1 | 3/2004 | Liprie | |
| 2004/0098966 A1 | 5/2004 | Dewis | |

FOREIGN PATENT DOCUMENTS

DE    19630058    1/1998

* cited by examiner

*Primary Examiner*—William H Rodriguez
(74) *Attorney, Agent, or Firm*—Thomas M. Freiburger

(57) ABSTRACT

A system and method for creating power and pasteurizing water is provided. The system includes a power generation subsystem and a water pasteurization subsystem, which are linked together as follows. The power generation subsystem comprises a turbine power generator. Air (or other suitable working fluid) flows through the turbine power generator to generate power by known methods. The air is heated prior to flowing into the turbine to increase its speed for greater power generation. The water pasteurization subsystem includes one or more heat exchangers, at least one of which is connected to receive the hot airflow exiting the turbine. The heat from the turbine-exiting airflow is utilized for pasteurizing colder wastewater inside the heat exchanger.

23 Claims, 4 Drawing Sheets

SYSTEM AND METHOD FOR WATER PASTEURIZATION AND POWER GENERATION

This application is a continuation of application Ser. No. 10/713,358, filed Nov. 14, 2003, now U.S. Pat. No. 6,931,860, which claimed priority from provisional application Ser. No. 60/427,063, filed Nov. 18, 2002.

BACKGROUND OF THE INVENTION

The present invention relates generally to water purification, and specifically to water pasteurization and turbine power generation.

Traditional methods for purifying wastewater include chlorination, exposure to ultraviolet (UV) radiation, and ultra filtration. Unfortunately, there are drawbacks to each of these methods.

Chlorination involves the treatment of water with chlorine or a chlorine compound. If the chlorine concentration is great enough, the treated water tends to smell and taste bad. Some people object to the smell and taste of very small amounts of chlorine. In addition, chlorination can be harmful to people's health. If water supplies contain humic compounds, which form as a part of the decomposition of organic materials such as leaves, grass, wood, or animal wastes, chlorination of such water can produce trihalomethanes (THMs). Because THMs are very seldom associated with groundwater, they are primarily a concern when surface water supplies are used. Lifetime consumption of water supplies with THMs at a lever greater than 0.10 milligrams per liter is considered by the Environmental Protection Agency to be a potential cause of cancer.

Treatment of water by exposure to ultraviolet radiation is complicated and maintenance intensive. It involves the use of UV lamps, which must be replaced periodically. UV treatment also often utilizes reflectors for focusing the UV light toward the water. Such reflectors must be cleaned from time to time. Also, it is generally desirable for the water flow through the UV treatment chambers to be laminar, to promote uniformity of UV exposure. This requires the use of baffles and specially designed treatment chambers, which increases costs.

Filtration involves causing the water to flow through a series of filters. Like UV treatment, filtration is maintenance intensive. The filters must be cleaned and/or replaced periodically. Further, filtration is often a slow process.

Pasteurization is yet another known method for purifying water. It involves heating water to a temperature of at least 150-170° F. Pasteurization is typically conducted at low water volumes, such as in campsites and other remote, rural locations. Small, portable solar water pasteurization units, or solar cookers, are sometimes used for pasteurizing water from solar heat. Generally, pasteurization is not used for large-scale water treatment due to the high costs associated with heating large amounts of water.

SUMMARY OF THE INVENTION

The preferred embodiments of the present invention recognize a new opportunity for synthesis between previously disparately conducted methods of power generation and water pasteurization. The illustrated embodiment utilizes the heat exhaust from turbine power generation to pasteurize large amounts of water.

In one aspect, the present invention provides a system for producing power and pasteurizing water, comprising a turbine, a power generator, a heat exchanger, and a heat source. The turbine is configured to receive a flow of a working fluid, and the working fluid flow is configured to rotate blades and an output shaft of the turbine. The power generator is coupled to the turbine output shaft and configured to convert rotation of the output shaft into power. The heat exchanger has first and second internal chambers. The first chamber is configured to receive working fluid exiting the turbine, while the second chamber is configured to receive water, such as untreated or even partially heated wastewater from a municipal wastewater reservoir. The chambers of the heat exchanger are configured to permit heat exchange between working fluid within the first chamber and water within the second chamber. Heat flows from the hot working fluid to the comparatively cold water to preferably raise the water temperature to at least a water pasteurization temperature. The heat source is configured to impart heat to working fluid flowing through the turbine and the first chamber of the heat exchanger. Typically, the heat source imparts heat to the working fluid upstream of the heat exchanger. In a preferred embodiment, the heat source imparts heat to the working fluid both upstream and downstream of the turbine.

In another aspect, the present invention provides a system for producing electric power and pasteurizing water, comprising a turbine power generator and a heat exchanger. The turbine power generator is configured to convert a flow of working fluid into electric power. The heat exchanger has first and second fluidly separate internal chambers. As used herein, "fluidly separate" chambers refers to chambers configured so that fluids within the chambers are not permitted to mix together. The first internal chamber is configured to receive an exhaust flow of working fluid from the turbine generator, while the second internal chamber is configured to receive water. The chambers are configured to permit heat exchange between working fluid within the first chamber and water within the second chamber, to preferably pasteurize water within the second chamber. In a narrower aspect, the system further comprises a heat source configured to impart heat to working fluid flowing into the turbine generator.

In yet another aspect, the present invention provides a method of producing power and pasteurizing water. A working fluid (in the illustrated embodiment, air) is caused to flow through a turbine power generator. The flow of working fluid causes the turbine power generator to generate power. After the working fluid exits the turbine power generator, the working fluid is directed into a first of two fluidly separate internal chambers of a heat exchanger. The chambers are configured to permit heat exchange between the working fluid within the first chamber and water within a second of the two chambers. The working fluid within the first chamber is at a temperature greater than a water pasteurization temperature. Water is caused to flow through the second chamber of the heat exchanger, the water initially being colder than the water pasteurization temperature. The water flowing through the second chamber is permitted to absorb heat from the working fluid within the first chamber. The flow rate of the water flowing through the second chamber of the heat exchanger is controlled so that the water temperature rises to the pasteurization temperature.

In yet another aspect, the present invention provides a method of producing electric power and pasteurizing water. Air is pumped through a turbine power generator. The air causes the turbine power generator to generate electric power. After the air exits the turbine power generator, heat is transferred from the air to water, to raise the water temperature to at least a water pasteurization temperature.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

A well-known method for producing electric power is to cause a fluid, such as steam or air, to flow at high speeds through a turbine power generator. A turbine power generator typically comprises a turbine coupled to a power generator. The turbine includes turbine blades and an output shaft. The power generator ordinarily includes a shaft that can be coupled to the turbine output shaft. The generator shaft is equipped with magnets for converting shaft rotation into electric power. Typically, the working fluid is brought to a superheated gaseous state to promote higher speed flow through the turbine. The fluid flows through the turbine blades to produce rotation of the turbine and generator shafts. The consequent movement of the electromagnetic fields of the magnets produces electric current. The generator ordinarily includes additional apparatus for capturing and storing the generated power. More elaborate apparatus and methods exist for power generation, which are based upon these fundamental principles.

Preferred embodiments of the present invention utilize the heat of the working fluid after it has exited the turbine power generator to pasteurize water. Thus, preferred embodiments of present invention recognize an opportunity for synergy between conventional power generation and water pasteurization.

Figure 1:
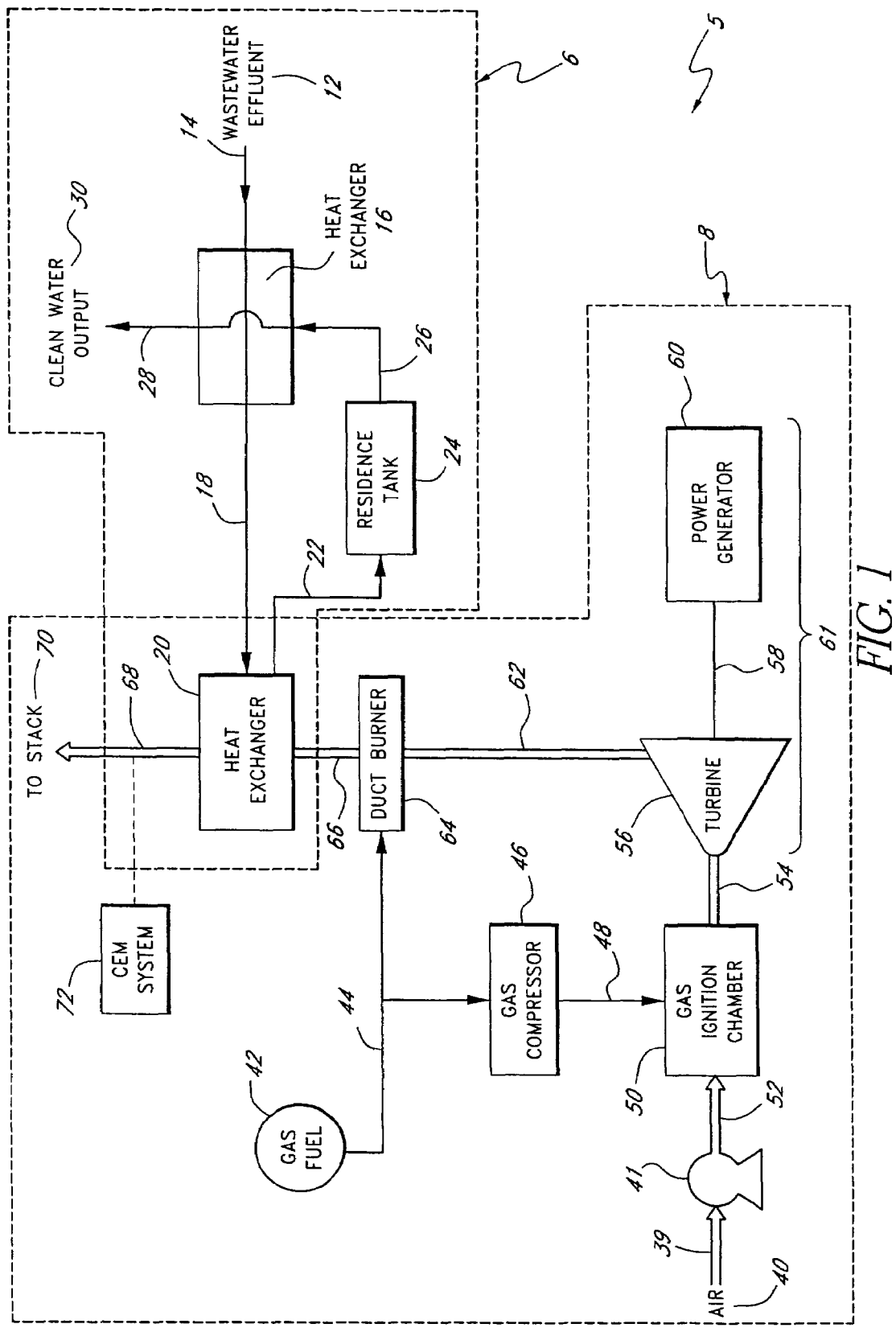
FIG. 1 is a flow diagram illustrating a water pasteurization and power generation system according to a preferred embodiment of the present invention.

FIG. 1 is a flow diagram illustrating a water pasteurization and power generation system 5 according to a preferred embodiment of the present invention. The system 5 comprises a water pasteurization subsystem 6 and a power generation subsystem 8, each identified by dotted lines in FIG. 1. As explained below, the water pasteurization subsystem 6 receives wastewater effluent 12 and outputs pasteurized clean water 30. Simultaneously, the power generation subsystem 8 creates electric power from superheated flow of a working fluid, such as air or water (but preferably air), through a turbine generator 61. Advantageously, as explained below, the water pasteurization subsystem 6 utilizes heat exhaust from the power generation subsystem 8, which is a readily segregated portion of energy from the power generation subsystem 8, creating a synergy between the two subsystems.

This specification begins with a description of the structural components of the system 5 and follows with an explanation of the operation of the system.

The major components of the water pasteurization subsystem 6 are a first heat exchanger 16, a second heat exchanger 20, and a residence tank 24. The subsystem 6 also includes a number of flow channels for connection between these components. The structural configuration of the subsystem 6 is now explained.

The first heat exchanger 16 is connected to four water flow channels as explained below. As used herein, a "flow channel" refers to one or more flow passages or chambers, which can assume any of a large variety of differing sizes and configurations. The first heat exchanger 16 includes two fluidly separate internal chambers. A first chamber serves as a conduit between a wastewater input flow channel 14 and a preheated water flow channel 18, while a second chamber serves as a conduit between a pasteurized water flow channel 26 and a clean water output flow channel 28. Although not shown in FIG. 1, the two chambers of the first heat exchanger 16 are preferably configured, as known in the heat exchanger art, to enhance heat exchange between fluids within the two chambers. Preferably, the two chambers are configured to have a large surface area of contact with one another to promote greater heat transfer therebetween.

Figure 2:
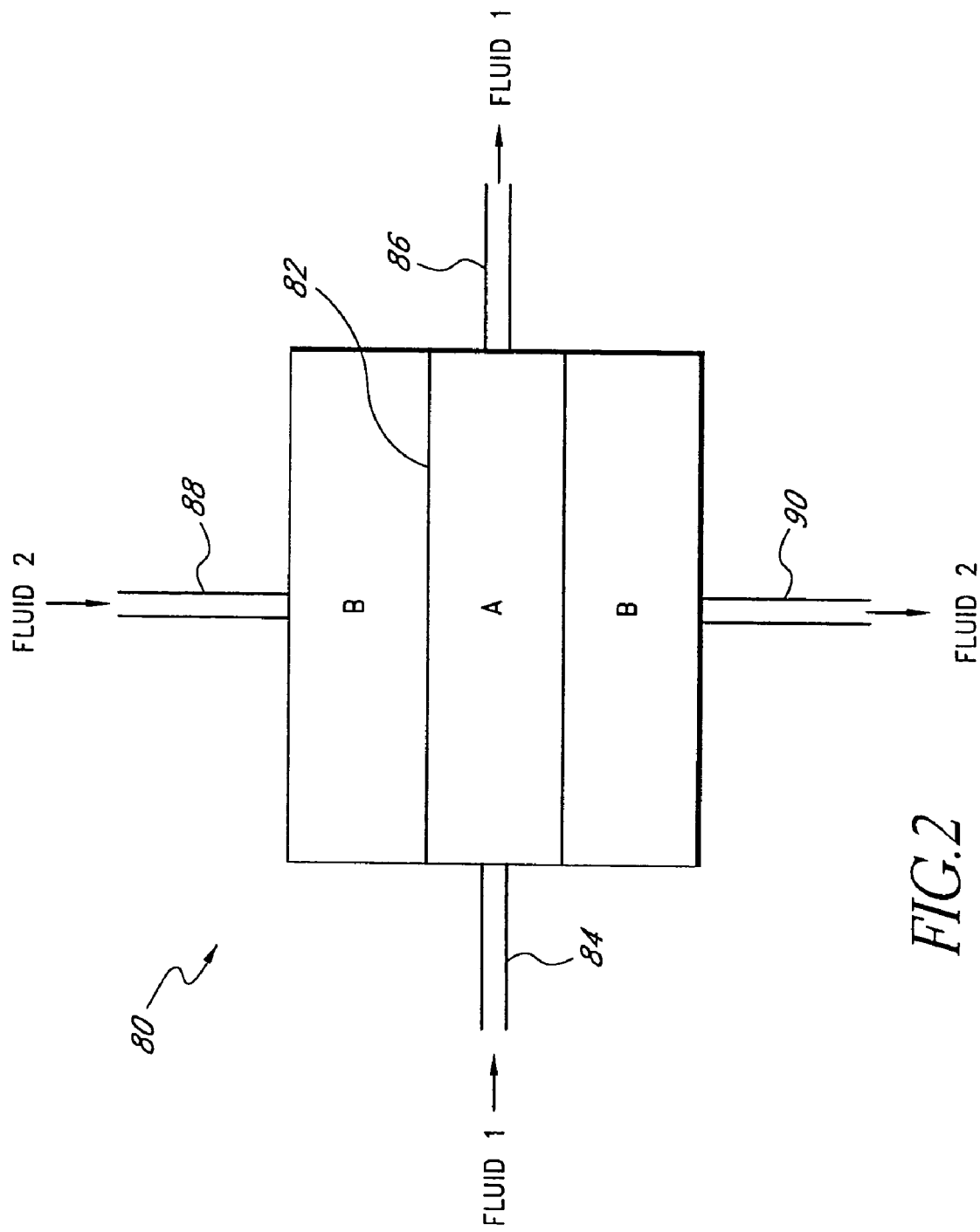
FIG. 2 is a schematic illustration of a heat exchanger used in preferred embodiments of the present invention.

FIG. 2 is a schematic illustration of a heat exchanger 80 appropriate for use with preferred embodiments of the present invention. In particular, the heat exchanger 80 is appropriate for use as the first heat exchanger 16 and/or the second heat exchanger 20 (described below) shown in FIG. 1, as well as any additional heat exchangers as may be desired. The heat exchanger 80 includes two fluidly separate internal chambers A and B, with an interface 82 separating the chambers. The heat exchanger 80 includes inlets 84 and 88 and outlets 86 and 90. The chamber A is connected to the inlet 84 and the outlet 88, while the chamber B is connected to the inlet 88 and the outlet 90. While FIG. 2 is shown as a two-dimensional representation, it will be understood that the heat exchanger 80 is a three-dimensional structure. As such, the chambers A and B are three-dimensional chambers. While chamber B is shown in two portions, it will be understood that chamber B is one contiguous chamber, as is chamber A. While the interface 82 of the schematic illustration is shown as two simple linear segments, it will be understood that the interface 82 is preferably configured to result in a large surface area of contact between chamber A and chamber B, to promote greater heat transfer therebetween. The two chambers are fluidly separate. Thus, a Fluid 1 can flow through chamber A via inlet 84 and outlet 86 and a Fluid 2 can flow through chamber B via inlet 88 and outlet 90, without any mixture of the two fluids inside the heat exchanger 80.

With continued reference to FIG. 1, the second heat exchanger 20 is connected to two water flow channels and two airflow channels as explained below. Like the first heat exchanger 16, the second heat exchanger 20 includes two fluidly separate internal chambers. A first chamber serves as a conduit between the preheated water flow channel 18 and a pasteurized water flow channel 22. A second chamber serves as a conduit between an airflow channel 66 and an airflow emissions channel 68. Although not shown, the two chambers of the second heat exchanger 20 are preferably configured, as known in the heat exchanger art, to enhance heat exchange between fluids within the two chambers. Preferably, the two chambers are configured to have a large surface area of contact with one another to promote greater heat transfer therebetween.

The pasteurized water flow channel 22 serves as a conduit between the second heat exchanger 20 and the residence tank 24. The pasteurized water flow channel 26 connects the residence tank 24 to one of the internal chambers of the first heat exchanger 16, as explained above. One or more of the water flow channels of the pasteurization subsystem 6 may be completely or partially insulated to prevent heat loss or gain. In one embodiment, all of the flow channels are insulated. Of course, there is preferably no insulation between the chambers in each of the heat exchangers.

The major components of the power generation subsystem 8 are a fuel source 42 (preferably natural gas), a gas compressor 46, a pump 41, a gas ignition chamber 50, the turbine generator 61, and a ductburner 64. The subsystem 8 also includes a number of flow channels for connection between these components. The structural configuration of the subsystem 8 is now explained.

The gas fuel source 42 is connected to the gas compressor 46 and the ductburner 64 via an uncompressed gas flow channel 44. The gas fuel source 42 preferably comprises natural gas, such as methane, propane, or butane, but others are possible. The gas compressor 46 is connected to the gas ignition chamber 50 via a compressed gas flow channel 48. The gas ignition chamber 50 is also connected to an airflow channel 52 and a turbine inlet airflow channel 54. In the illustrated embodiment, the pump 41 is provided for pumping air 40 received at a pump inlet 39 into the airflow channel 52. The gas ignition chamber 50 preferably includes a natural gas igniter (also not shown), such as an electric spark generator, a flame generator, or other like apparatus. The turbine inlet airflow channel 54 is connected to an inlet of the turbine generator 61. In the illustrated embodiment, the turbine generator 61 includes a turbine 56 having an output shaft 58 coupled to a power generator 60. As used herein, a "turbine generator" is a combination of a turbine and a power generator, the turbine output shaft configured to drive the generator.

A fluid output of the turbine 56 is connected to the ductburner 64 via an "exhaust" airflow channel 62. The airflow exiting the turbine 56 into the airflow channel 62 is sometimes referred to herein as the "turbine exhaust." The ductburner 64 is also connected to the aforementioned airflow channel 66 that leads to the second heat exchanger 20. The airflow emissions channel 68, which is also connected to the second heat exchanger 20, leads to a stack 70 for emission of air into the environment. A continuous emissions monitoring (CEM) system 72, as known in the art, is preferably provided for monitoring the quality of air in the airflow emissions channel 68. One or more of the airflow channels of the power generation subsystem 8 may be completely or partially insulated to prevent heat loss or gain. In one embodiment, all of the flow channels are insulated.

Now the operation of the entire system 5 will be explained, according to a preferred embodiment of the invention. As mentioned above, the power generation subsystem 8 converts superheated airflow into electric power. Air 40 at or near room temperature (e.g., 59° F.) is preferably pumped through the airflow channel 52 into the gas ignition chamber 50. Simultaneously, natural gas at approximately 100 psig flows from the gas fuel source 42 through the uncompressed gas flow channel 44 into the gas compressor 46. The compressor 46 compresses the gas to a much higher pressure (e.g., 318 psig), so that the gas, when ignited, will have a greatly increased heat generation capacity. The pressurized gas flows through the compressed gas flow channel 48 into the gas ignition chamber 50. In the gas ignition chamber 50, the pressurized natural gas mixes with the air 40. The natural gas ignition means (not shown) ignites the pressurized natural gas in the presence of the air 40, releasing a great deal of heat into the air. As a result, the air inside the gas ignition chamber 50 is brought to a superheated, pressurized gaseous state. In this condition, the superheated air (including exhaust fumes from ignition) flows at high speed through the turbine inlet airflow channel 54 into the turbine 56. The flow of superheated air at high speeds causes the turbine blades to rotate, producing rotation of the output shaft 58. The power generator 60 converts this rotation into electricity in the manner explained above.

After the superheated air flows through the turbine 56, it continues through the exhaust airflow channel 62 into the ductburner 64. The ductburner 64 receives natural gas via the uncompressed gas flow channel 44. In an alternative embodiment, the ductburner 64 may receive compressed gas flow from the compressed gas flow channel 48. Like the gas ignition chamber 50, the ductburner 64 preferably includes a natural gas igniter (not shown), such as an electric spark generator, a flame generator, or other like apparatus. Inside the ductburner 64, the natural gas is ignited to impart additional heat to the air as it flows onward through the airflow channel 66 into one of the two internal chambers of the second heat exchanger 20. It will be understood that the ductburner 64, while preferred, is not required. Inside the second heat exchanger 20, the air cools down significantly due to heat exchange with cooler water, as described below. The cooled air exits the second heat exchanger 20 via the airflow emissions channel 68. The cooled air is emitted to the environment through a stack 70.

In order to comply with emissions standards, the second heat exchanger 20 preferably includes catalysts for cleaning the air before it is emitted into the environment via the stack 70. Preferably, a selective catalytic reduction (SCR) catalyst is utilized for reducing nitrogen oxide (Nox) emissions. The SCR catalyst may be used in conjunction with reducing agents, such as ammonia- or urea-based compounds. Other catalysts may also be used for complying with emissions standards, such as CO catalysts, as known in the art. As mentioned above, a CEM system 72 is preferably utilized for monitoring the quality of the air emitted into the environment via the stack 70, to ensure compliance with emissions standards.

In operation, the water pasteurization subsystem 6 pasteurizes wastewater effluent 12 by causing the wastewater 12 to flow through the heat exchangers 16 and 20. Before entering the water pasteurization subsystem 6, the wastewater effluent 12 is at or near room temperature (e.g. 60-66° F.). The wastewater 12 flows into one of the two internal chambers of the first heat exchanger 16 via the wastewater input flow channel 14. Although not shown, a pump can be provided to pump the wastewater 12 into the input flow channel 14. Alternatively, the wastewater 12 can flow into the input flow channel 14 by gravity alone, by, for example, a collection tank positioned vertically above the first heat exchanger 16. In some configurations, filters can be provided to filter out larger debris from the wastewater 12 before it flows into the first heat exchanger 16.

It will be understood that there may be other structures and systems for transferring heat from turbine exhaust to unpasteurized wastewater. For example, there may alternatively be provided a closed circulating fluid system for transferring heat from the turbine exhaust inside the second heat exchanger 20 to the wastewater inside the first heat exchanger 16. Other heat exchanging structures and systems are also possible.

Inside one of the two internal chambers of the first heat exchanger 16, the wastewater absorbs heat from hot, pasteurized water inside the other of the two chambers (explained below). This raises the temperature of the wastewater to a pasteurization or near-pasteurization level (e.g., preferably at least 130° F., more preferably at least 135° F., and even more preferably 140-148° F.). The warmed water then flows through the preheated water flow channel 18 into one of the two internal chambers of the second heat exchanger 20. In the second heat exchanger 20, the water absorbs additional heat from the hot air flowing through the other internal chamber of the heat exchanger 20. This causes the water temperature to rise even further, to a pasteurization level (e.g., preferably 150-170° F., more preferably at least 160° F., and even more preferably 160-161° F.). The pasteurized water then flows through the pasteurized water flow channel 22 into the residence tank 24. It will be appreciated that the residence tank 24 can be omitted from the design or moved downstream of the output water flow channel 28, to serve as a later-stage collection tank. The pasteurized water continues through the pasteurized water flow channel 26 into the internal chamber of the first heat exchanger 16 that does not contain the incoming wastewater effluent 12 from the wastewater input flow channel 14. As explained above, the hot pasteurized water loses heat to the cooler wastewater 12, causing the pasteurized water temperature to drop, preferably back to approximately room temperature (e.g., 76° F.). The cooled pasteurized water exits the first heat exchanger 16 via the clean water output flow channel 28, as clean output water 30.

It will also be appreciated that there is preferably provided a flow controller for controlling the rate of water flow through the second heat exchanger 20. Preferably, the water flow through the second heat exchanger 20 is controlled so that the water absorbs sufficient heat from the turbine exhaust airflow to rise in temperature to a water pasteurization temperature, for a time period sufficient to pasteurize the water.

In one preferred embodiment, the natural gas fuel from the gas fuel source 42 and in the uncompressed gas flow channel 44 is at approximately 100 psig and provides about 7.1 MMBtu/hr of power. After the gas is pressurized in the gas compressor 46, it is preferably at approximately 318 psig and provides about 74.6 MMBtu/hr of power. In one embodiment, the turbine generator 61 is the TAURUS 70-T10301S, sold by Solar Turbines of San Diego, Calif. At an elevation of 200 feet above sea level, ambient temperature of 59° F., and humidity of 60%, this particular turbine generator has a gross power output of 7.160 MW. Under all of these conditions, the turbine exhaust air in the airflow channel 62 has a flow rate of about 210,044 lb/hr and a temperature of about 916° F. Preferably, the additional heat imparted to the air in the ductburner 64 from the natural gas in the uncompressed gas flow channel 44 brings the air temperature to about 1034° F. In the preferred embodiment, the cooled air exiting the second heat exchanger 20 has a temperature of about 250° F. and flows at about 210,385 lb/hr out of the stack 70.

In this preferred embodiment, the heat exchangers 16 and 20 and the residence tank 24 are sized and configured to pasteurize about 10 million gallons of wastewater effluent 12 per day. In another preferred embodiment, the system is sized and configured to pasteurize twice that amount per day. The skilled artisan will appreciate that the capacity of the system 5 can be adjusted by varying the sizes and heat transfer qualities of the heat exchangers 16 and 20, by varying the sizes of the residence tank 24 and the water flow channels, by selection of different natural gas fuels with different heating capacities, and/or by selection of different turbine exhaust generators 61 with different turbine exhaust airflow characteristics. In preferred embodiments, the heat exchangers are configured to pasteurize preferably at least 5 million, more preferably at least 10 million, more preferably at least 15 million, and even more preferably at least 20 million gallons of wastewater per day.

In preferred embodiments, the water remains at the pasteurization temperature for preferably at least 2 seconds, more preferably at least 5 seconds, more preferably at least 10 seconds, and even more preferably at least 15 seconds. Generally, the hotter the water temperature the less time is required for pasteurization. Pasteurization of the water at a temperature of at least 160° F. for at least five seconds is preferred. At 200° F., a pasteurization time of at least two seconds is preferred. The water pasteurization temperature (i.e., the temperature of the water in the water flow channel 22) is preferably 150-212° F. and more preferably 155-200° F. Pasteurization in the range of 150-170° F. is desirable because higher temperatures would require greater heat generation from the power generation subsystem 8, which would in turn increase costs and/or decrease the rate of production. The water pasteurization temperature is preferably at least 160° F.

It is expected that the present invention will have particular advantage and utility at the city level. The invention permits municipalities to produce power and pasteurize water locally in a cost-effective manner. The power generated can supplement power purchased from larger power companies. The pasteurized water can be used for local purposes. As used at a local or city level, the turbine 56 of the water pasteurization and power generation system 5 is preferably of a relatively smaller size. In one embodiment, the turbine 56 is capable of producing up to 50 MW of power, and more preferably up to 1000 MW of power. In one preferred embodiment, the water pasteurization and power generation system 5 is capable of treating about 200,000 gallons of water per megawatt of power generated. The system 5 is preferably capable of treating preferably at least 100,000 gallons/MW and more preferably at least 500,000 gallons/MW of power generated. The system 5 is most preferably capable of treating 200,000-1,500,000 gallons/MW of power generated. In one preferred embodiment, the system is capable of treating 1.4 million gallons/MW of power generated.

The skilled artisan will appreciate that it is not necessary for the water pasteurization subsystem 6 to include two heat exchangers as taught herein. For example, the wastewater 12 could be pasteurized by use of a single heat exchanger receiving the turbine exhaust airflow (e.g., eliminate the first heat exchanger 16 and introduce the wastewater 12 directly into the second heat exchanger 20). However, two heat exchangers are preferred because it increases the pasteurization capacity of the subsystem 6 significantly. If a single heat exchanger is used, it must raise the temperature of the wastewater 12 from at or near room temperature to at least the pasteurization temperature of 150-170° F., an increase of about 100° F. In order to increase the water temperature this much, the water flow rate through the single heat exchanger must be limited, so that the water absorbs enough heat from the turbine exhaust airflow. In the single heat exchanger configuration, it is estimated that the system 5 can pasteurize 250,000 gallons of water per megawatt of power generated. However, by utilizing two heat exchangers 16, 20 as illustrated, it is possible for the first heat exchanger 16 to preheat the wastewater 12 to approximately 140° F. Thus, the second heat exchanger 20 only needs to increase the water temperature by 10-31° F.

(preferably up to 150-171° F., more preferably up to 160-161° F.). This permits a higher water flow rate. It is estimated that with two heat exchangers the system 5 can pasteurize 1.4 million gallons of water per megawatt of power generated. Another benefit of using two heat exchangers is that the pasteurized water becomes cooled to near room temperature. While the illustrated embodiment utilizes two heat exchangers, the skilled artisan will appreciate that the system 5 can include any number of heat exchangers connected in series in the manner shown in FIG. 1.

While the illustrated embodiment utilizes natural gas to heat up the air flowing into and exiting the turbine generator, it will be appreciated that the benefits of the invention can also be obtained by using alternative sources of heat generation, such as nuclear energy or burning coal. It will be appreciated that any of a variety of different forms of energy can be used to heat up the air flowing into and exiting the turbine generator.

With continued reference to FIG. 1, the water pasteurization and power generation system 5 can utilize so-called "digester gas" from preheated and oxidized wastewater as a source of fuel for heating the working fluid of the power generation subsystem 8. Preferably, the wastewater 12 is preheated and oxidized prior to entering the first heat exchanger 16. The preheating and oxidation promotes the growth of bacteria and causes the wastewater to release digester gas, typically methane gas. When ignited, the digester gas is capable of imparting additional heat to the working fluid.

Figure 3:
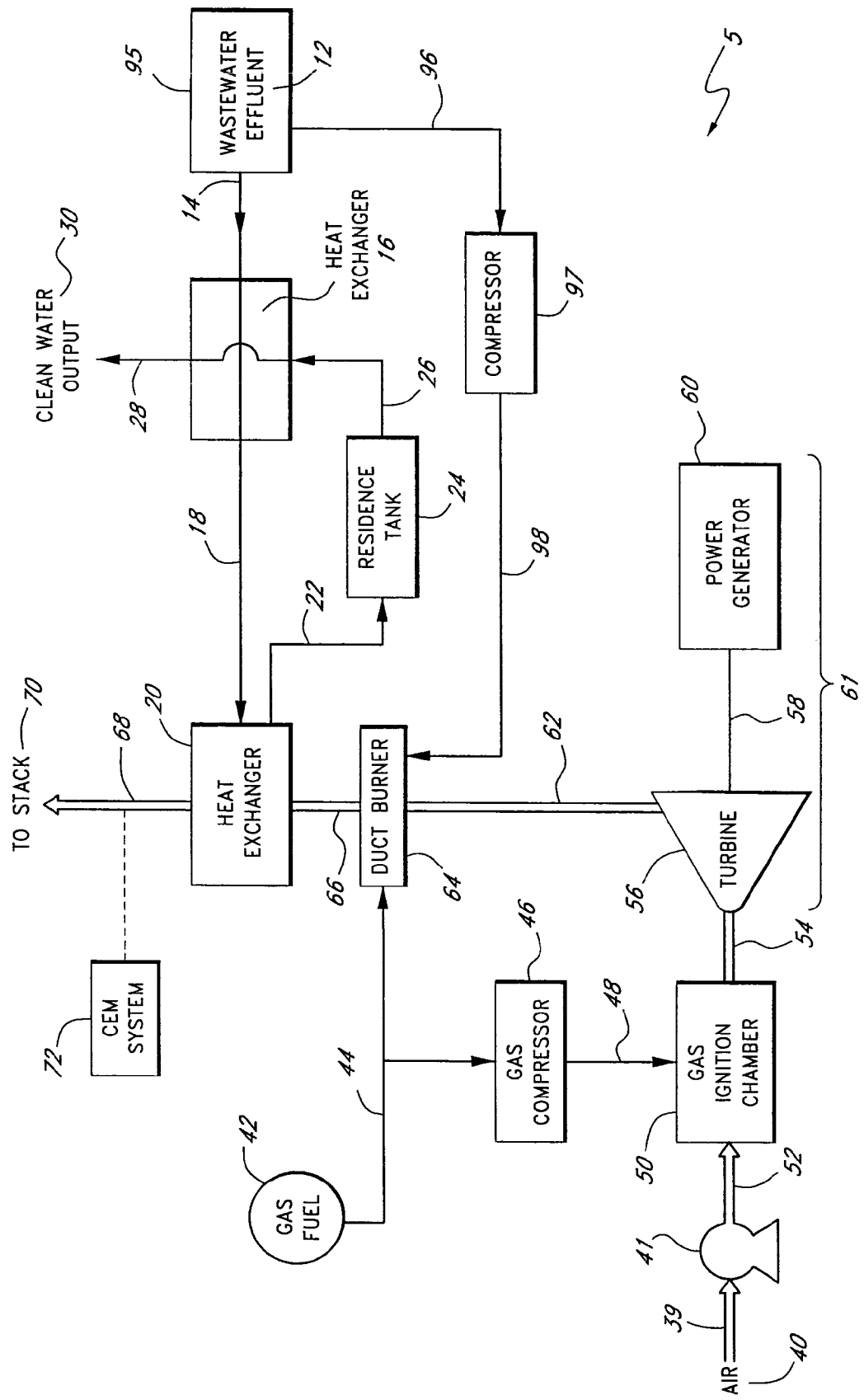
FIG. 3 is a flow diagram illustrating an embodiment of the invention in which digester gas from the wastewater is utilized as an additional source of heat at the ductburner.

FIG. 3 shows one embodiment of a system of the invention utilizing digester gas as an additional heat source for the working fluid of the power generation subsystem, wherein the digester gas is sent to the ductburner 64. The wastewater 12 is preliminarily collected in a chamber or tank 95. As mentioned above, the wastewater 12 is preheated and/or oxidized to effect the release of digester gas into a digester gas flow channel 96 that is connected to a gas compressor 97. Compression of the digester gas is desirable in order to raise the heat production capacity of the digester gas, preferably to a level compatible with that of the natural gas 42 in the preferred embodiment. After the digester gas is compressed within the compressor 97, it flows through a digester gas flow channel 98 into the ductburner 64, where it mixes with the natural gas 42 from the natural gas flow channel 44, in the preferred embodiment. In an alternative embodiment, the compressor 97 is omitted from the design, preferably with a single unobstructed digester gas flow channel from the tank 95 to the ductburner 64.

Figure 4:
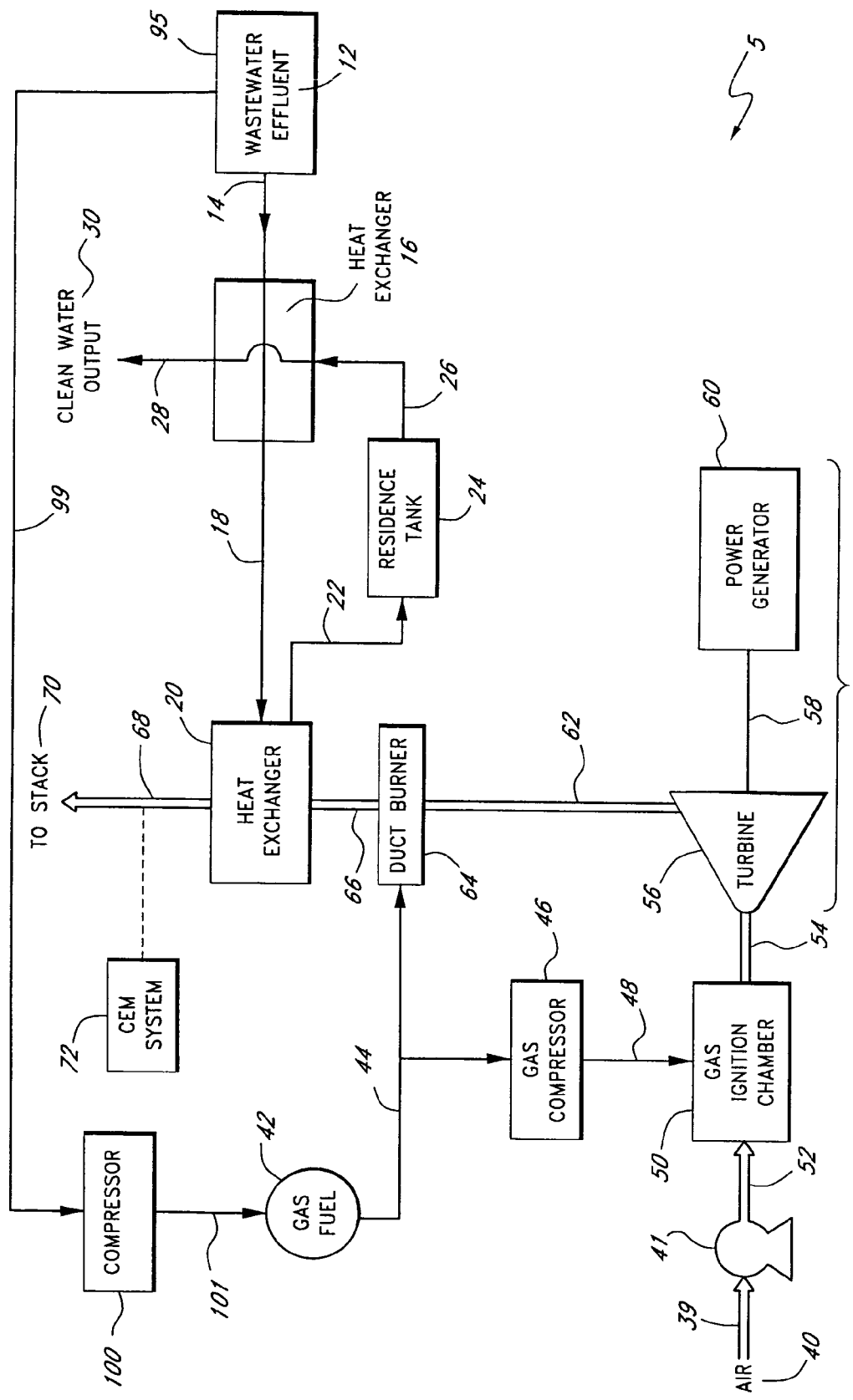
FIG. 4 is a flow diagram illustrating an embodiment of the invention in which digester gas from the wastewater is mixed with the natural gas fuel source.

FIG. 4 shows another embodiment that utilizes digester gas as an additional heat source for the working fluid of the power generation subsystem, wherein the digester gas mixes directly with the natural gas fuel source 42 of the preferred embodiment. The digester gas flows from the tank 95 through a digester gas flow channel 99 and into a gas compressor 100. After the digester gas is compressed within the compressor 100, it flows through a digester gas flow channel 101 directly into the natural gas source 42 in the preferred embodiment. In this embodiment, the digester gas mixes with the working fluid upstream of the turbine 56. In some cases, the introduction of digester gas into the turbine 56 may present a risk of turbine damage and/or may degrade turbine performance, in which case the embodiment of FIG. 3 is more preferable to that of FIG. 4. However, when there is no risk of the digester gas damaging the turbine (or when such risk is negligible), the embodiment of FIG. 4 may be preferred in some cases. In an alternative embodiment, the compressor 100 is omitted from the design, preferably with a single unobstructed digester gas flow channel from the tank 95 to the national gas fuel source 42 of the preferred embodiment.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A system for producing electric power and pasteurizing wastewater, comprising:
    a source of wastewater,
    a turbine power generator configured to convert a flow of working fluid into electric power; and
    a heat exchanger having first and secondly fluidly separate internal chambers, the first internal chamber configured to receive an exhaust flow of working fluid from the turbine generator, the second internal chamber configured to receive wastewater from the source of wastewater, the chambers configured to permit heat exchange between working fluid within the first chamber and wastewater within the second chamber to pasteurize wastewater within the second chamber.

2. The system of claim 1, further comprising a heat source configured to impart heat to working fluid into the turbine generator.

3. The system of claim 1, wherein
    the wastewater is wastewater being treated at a municipal treatment facility, and the electric power produced by the generator comprising power used in operating the treatment facility.

4. A system for producing power and pasteurizing wastewater, comprising:
    a source of wastewater,
    a turbine configured to receive a flow of a working fluid, the working fluid flow configured to rotate blades and an output shaft of the turbine;
    a power generator coupled to the turbine output shaft and configured to convert rotation of the output shaft into power;
    a heat exchanger having first and second internal chambers, the first chamber configured to receive working fluid exiting the turbine, the second chamber configured to receive wastewater from the source of wastewater, the chambers configured to permit heat exchange between working fluid within the first chamber and wastewater within the second chamber; and
    a heat source configured to impart heat to working fluid flowing through the turbine and the first chamber of the heat exchanger.

5. The system of claim 4, wherein the heat source is configured to impart sufficient heat to the working fluid flowing through the turbine and the first chamber of the heat exchanger so that the working fluid is hot enough to raise the temperature of water flowing through the second chamber of the heat exchanger to at least a water pasteurization temperature.

6. A method of producing power and pasteurizing wastewater, comprising:
   causing a working fluid to flow through a turbine power generator, the flow of working fluid causing the turbine power generator to generate electric power;
   after the working fluid exits the turbine power generator, directing the working fluid into a first of two fluidly separate internal chambers of a heat exchanger, the chambers configured to permit heat exchange between the working fluid within the first chamber and wastewater within a second of the two chambers, the working fluid within the first chamber being at a temperature greater than a water pasteurization temperature;
   causing wastewater to flow through the second chamber of the heat exchanger, the wastewater initially being colder than the water pasteurization temperature;
   permitting the wastewater flowing through the second chamber to absorb heat from the working fluid within the first chamber such that the water temperature rises to at least the pasteurization temperature.

7. The method of claim 6, further comprising heating the working fluid after it exits the turbine power generator and before it enters the first chamber of the heat exchanger.

8. The method of claim 6, wherein the pasteurization temperature is 150-170° F.

9. The method of claim 6, further comprising pasteurizing at least 200,000 gallons of water per day per megawatt of power generated.

10. The method of claim 6, further comprising pasteurizing at least 500,000 gallons of water per day per megawatt of power generated.

11. The method of claim 6, further comprising:
   heating and oxidizing the unpasteurized water before it flows through the second chamber of the heat exchanger so that the water releases digester gas;
   causing the digester gas to mix with the working fluid; and
   igniting the digester gas in the presence of the working fluid so that the digester gas imparts heat to the working fluid.

12. The method of claim 11, further comprising mixing the digester gas with natural gas prior to said step of causing the digester gas to mix with the working fluid.

13. The method of claim 11, further comprising compressing the digester gas prior to said step of causing the digester gas to mix with the working fluid.

14. The method of claim 6, wherein the wastewater is wastewater being treated at a municipal treatment facility, and the method including using the electric power produced by the generator to help provide power used in operating the treatment facility.

15. A method of producing power and pasteurizing water, comprising:
   heating a working fluid by mixing the working fluid with ignited natural gas fuel, then causing the working fluid to flow through a turbine power generator, the flow of working fluid causing the turbine power generator to generate electric power;
   after the working fluid exits the turbine power generator, directing the working fluid into a first of two fluidly separate internal chambers of a heat exchanger, the chambers configured to permit heat exchange between the working fluid within the first chamber and water within a second of the two chambers, the working fluid within the first chamber being at a temperature greater than a water pasteurization temperature;
   causing unpasteurized water to flow through the second chamber of the heat exchanger, the water initially being colder than the water pasteurization temperature;
   permitting the water flowing through the second chamber to absorb heat from the working fluid within the first chamber so that the water temperature rises to at least the pasteurization temperature.

16. The method of claim 15, further comprising compressing the natural gas fuel inside a gas compressor prior to mixing the natural gas fuel with the working fluid.

17. A method of producing power and pasteurizing water, comprising:
   heating a working fluid by causing the working fluid to absorb heat from burning coal, then causing the working fluid to flow through a turbine power generator, the flow of working fluid causing the turbine power generator to generate electric power;
   after the working fluid exits the turbine power generator, directing the working fluid into a first of two fluidly separate internal chambers of a heat exchanger, the chambers configured to permit heat exchange between the working fluid within the first chamber and water within a second of the two chambers, the working fluid within the first chamber being at a temperature greater than a water pasteurization temperature;
   causing unpasteurized water to flow through the second chamber of the heat exchanger, the water initially being colder than the water pasteurization temperature;
   permitting the water flowing through the second chamber to absorb heat from the working fluid within the first chamber so that the water temperature rises to at least the pasteurization temperature.

18. A method of producing power and pasteurizing water, comprising:
   heating a working fluid by causing the working fluid to absorb nuclear energy, then causing the working fluid to flow through a turbine power generator, the flow of working fluid causing the turbine power generator to generate electric power;
   after the working fluid exits the turbine power generator, directing the working fluid into a first of two fluidly separate internal chambers of a heat exchanger, the chambers configured to permit heat exchange between the working fluid within the first chamber and water within a second of the two chambers, the working fluid within the first chamber being at a temperature greater than a water pasteurization temperature;
   causing unpasteurized water to flow through the second chamber of the heat exchanger, the water initially being colder than the water pasteurization temperature;
   permitting the water flowing through the second chamber to absorb heat from the working fluid within the first chamber so that the water temperature rises to at least the pasteurization temperature.

19. A method of producing power and pasteurizing water, comprising:
   causing a working fluid to flow through a turbine power generator, the flow of working fluid causing the turbine power generator to generate electric power;
   after the working fluid exits the turbine power generator, directing the working fluid into a first of two fluidly separate internal chambers of a heat exchanger, the chambers configured to permit heat exchange between the working fluid within the first chamber and water within a second of the two chambers, the working fluid within the first chamber being at a temperature greater than a water pasteurization temperature;

causing unpasteurized water to flow through the second chamber of the heat exchanger, the water initially being colder than the water pasteurization temperature;

permitting the water flowing through the second chamber to absorb heat from the working fluid within the first chamber so that the water temperature rises to at least the pasteurization temperature; and wherein the heat exchanger is a second heat exchanger, and wherein causing water to flow through the second chamber of the second heat exchanger comprises:

causing the unpasteurized water to flow through a first of two fluidly separate internal chambers of a first heat exchanger, the chambers of the first heat exchanger configured to permit heat exchange between the unpasteurized water within the first chamber of the first heat exchanger and water within a second of the two chambers of the first heat exchanger;

permitting the unpasteurized water flowing through the first chamber of the first heat exchanger to absorb heat from water within the second chamber of the first heat exchanger;

causing the unpasteurized water within the first chamber of the first heat exchanger to flow from the first heat exchanger into the second chamber of the second heat exchanger;

permitting the water within the second chamber of the second heat exchanger to absorb heat from the working fluid within the first chamber of the second heat exchanger, so that the water within the second chamber of the second heat exchanger is brought to the pasteurization temperature; and causing the water at the pasteurization temperature to exit the second chamber of the second heat exchanger and flow through the second chamber of the first heat exchanger.

20. A system producing power and pasteurizing unpasteurized water, comprising:

an engine driving a power generator, a source of unpasteurized water, a first heat exchanger and a second heat exchanger, the first heat exchanger having first and second fluidly separate internal chambers, the first chamber having an input configured to receive water from the source of unpasteurized water and an output to discharge the water therefrom after heat exchange, and the second chamber of the first heat exchanger having an input and an output for a liquid to flow through the second chamber, and the two chambers being configured to permit heat exchange between the unpasteurized water flowing through the first chamber and the liquid flowing through the second chamber to raise the temperature of the water flowing through the first chamber, the second heat exchanger having first and second internal chambers fluidly separate from one another, the first chamber of the second heat exchanger configured to receive a first fluid carrying away heat from the engine, the second chamber of the second heat exchanger configured to receive unpasteurized water from the output of the first chamber of the first heat exchanger, the two chambers of the second heat exchanger being configured to permit heat exchange between the first fluid flowing through the first chamber of the second heat exchanger and the unpasteurized water flowing through the second chamber of the second heat exchanger to raise the temperature of the unpasteurized water to a pasteurization temperature, and the input of the second chamber of the first heat exchanger being configured to receive heated, pasteurized water from the output of the second chamber of the second heat exchanger, the heated, pasteurized water comprising the liquid flowing through the second chamber of the first heat exchanger, whereby the heated, pasteurized water flowing through the first heat exchanger preheats the unpasteurized water received from the source of unpasteurized water and flowing through the first chamber of the first heat exchanger so that the water exiting the first chamber of the first heat exchanger is partially heated prior to heat exchange with the first fluid in the second heat exchanger, to efficiently bring the unpasteurized water to pasteurization temperature in the second heat exchanger.

21. A method of producing power and pasteurizing unpasteurized water, comprising:

generating electric power in a way that produces heat, utilizing the heat by carrying the heat in a heated fluid into a first of two fluidly separate internal chambers of a heat exchanger, the chambers configured to permit heat exchange between the heated fluid within the first chamber and unpasteurized water within a second of the two chambers, the heated fluid within the first chamber being at a temperature greater than pasteurization temperature for the unpasteurized water;

causing unpasteurized water to flow through the second chamber of the heat exchanger, the water initially being colder than the pasteurization temperature;

permitting the unpasteurized water flowing through the second chamber to absorb heat from the heated fluid within the first chamber so that the water temperature rises to the pasteurization temperature and so that substantially all of the water becomes pasteurized within the heat exchanger; and wherein the heat exchanger is a second heat exchanger, and wherein the method further comprises:

causing unpasteurized water from a source of unpasteurized water to flow through a first of two fluidly separate internal chambers of a first heat exchanger, and causing heated, pasteurized water exiting the second chamber of the second heat exchanger to flow through a second of the two chambers of the first heat exchanger, the chambers of the first heat exchanger configured to permit heat exchange between the unpasteurized water within the first chamber of the first heat exchanger and heated, pasteurized water within the second chamber of the first heat exchanger, and permitting the unpasteurized water flowing through the first chamber of the first heat exchanger to absorb heat from the heated, pasteurized water within the second chamber of the first heat exchanger; and causing the unpasteurized water within the first chamber of the first heat exchanger to flow from the first heat exchanger into the second chamber of the second heat exchanger, so that the unpasteurized water is partially heated before entering the second heat exchanger.

22. The method of claim 21, wherein the electric power generated is used to power a wastewater treatment facility, which is the source of the unpasteurized water.

23. A method of producing electric power and pasteurizing wastewater in a wastewater treatment facility, comprising:

generating electric power using an engine that produces heat, utilizing the heat by carrying the heat in a heated fluid into a first of two fluidly separate internal chambers of a heat exchanger, the chambers configured to permit heat exchange between the heated fluid within the first chamber and wastewater within a second of the two chambers, the heated fluid within the first chamber being at a temperature greater than a water pasteurization temperature, causing unpasteurized wastewater to flow through the second chamber of the heat exchanger, the wastewater initially being colder than the water pasteurization temperature, permitting the wastewater flowing through the second chamber to absorb heat from the heated fluid within the first chamber, so that the wastewater temperature rises to at least the pasteurization temperature, and utilizing the electric power produced by the generator to power the wastewater treatment facility.

* * * * *